April 23, 1946.  J. J. CROWE  2,398,884
GAS TORCH
Filed Dec. 15, 1943
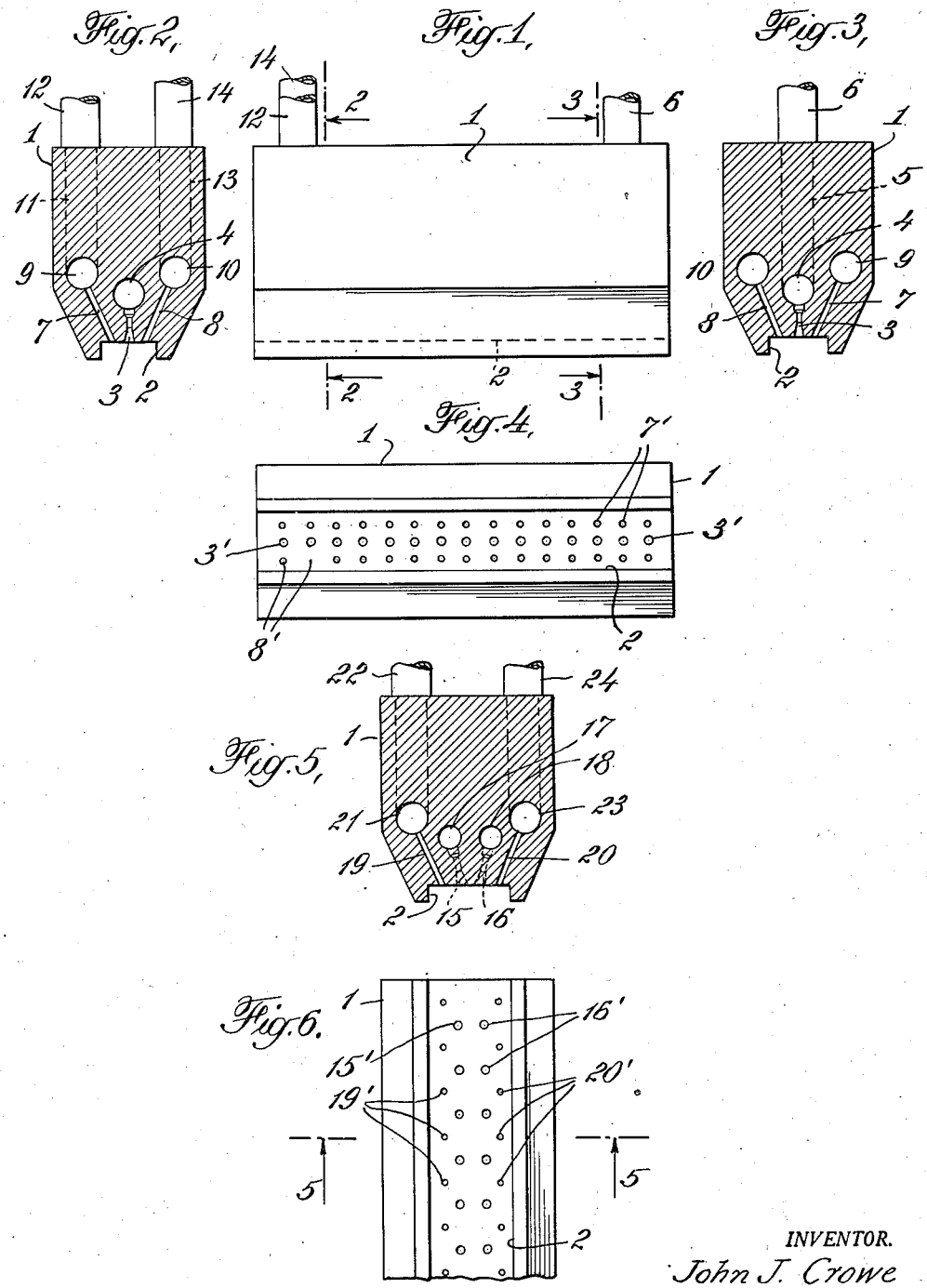
INVENTOR.
John J. Crowe
BY
ATTORNEYS Patented Apr. 23, 1946

2,398,884

UNITED STATES PATENT OFFICE 2,398,884

GAS TORCH

John J. Crowe, Westfield, N. J., assignor to Air Reduction Company, Incorporated, a corporation of New York Application December 15, 1943, Serial No. 514,354

5 Claims. (Cl. 158—27.4)

This invention relates to torches such as oxyacetylene torches, and more particularly to torches intended for use in descaling or flame-cleaning metal surfaces.

For some types of descaling or flame-cleaning, high velocity jets are more effective than low velocity ones. Also it is advantageous that a descaling or flame-cleaning torch operate on the external mixing principle, i. e., mixing of the oxygen and fuel gas outside of the torch tip instead of within it. An external-mixing descaling or flame-cleaning torch can operate much hotter than an internal-mixing one because there is no possibility of flash-backs from overheating. An external-mixing torch will operate satisfactorily until the tip becomes so hot that the acetylene disassociates. A descaling or flame-cleaning torch that can withstand such a high temperature is desirable because users prefer that the torch be not water cooled since they have to be moved over large areas and hoses for cooling water are therefore objectionable and inconvenient.

The principal object of this invention is to provide a descaling or flame-cleaning torch which operates on both the high velocity jet principle and the external-mixing principle and combines the advantages of each.

According to the invention the tip of the torch, which is preferably of the block type, has at least two parallel rows of discharge orifices. Passages within the tip deliver oxygen and fuel gas to the discharge orifices, the fuel gas being delivered to one row of orifices and the oxygen to another row. The oxygen passages and fuel gas passages do not communicate within the tip but deliver the oxygen and fuel gas separately to the discharge orifices and converge in such a way as to cause the oxygen and fuel gas to mix outside of the torch tip. The passages are designed to cause issuance of the gas from one or more rows of the discharge orifices in the form of high velocity jets and from another row or rows of discharge orifices in the form of relatively low velocity jets, this combination, with the aid of a recess in the face of the tip into which the orifices discharge, serving to prevent the flames from being blown out by the high velocity gas.

Several embodiments of the invention are illustrated in the accompanying drawing, in which:

Figure 1 is a side elevation of the torch;

Fig. 2 is a vertical transverse section taken on the line 2—2 of Fig. 1;

Fig. 3 is a vertical transverse section taken on the line 3—3 of Fig. 1;

Fig. 4 is a bottom view of the torch shown in Fig. 1;

Fig. 5 is a vertical transverse section of a modified form of torch embodying the invention, the section being taken on the line 5—5 of Fig. 6; and Fig. 6 is a bottom view of a portion of the torch shown in Fig. 5.

Referring first to Figs. 1 to 4 inclusive, the torch illustrated therein comprises an elongated block tip 1 having a recess 2 in its lower face extending lengthwise of the block. The block has a row of gas passages 3 terminating in a row of discharge orifices 3' in the face of the recess 2, as shown in Fig. 4. The passages 3 are all fed with gas from a distributing chamber 4 within the block and extending lengthwise of it. Gas may be supplied to the distributing chamber 4 through vertical passage 5 in the block communicating with a gas supply pipe 6 (Fig. 3).

The torch block is also provided with two rows of gas passages 7 and 8 on opposite sides of the row of passages 3. The passages 7 terminate in a row of discharge orifices 7' in the face of the recess 2 at one side of the orifices 3', and the passages 8 terminate in discharge orifices 8' in the face of the recess at the other side of the orifices 3 (Fig. 4). The passages 7 are all fed with gas from a distributing chamber 9 in the block at one side thereof and extending lengthwise of the block, and the passages 8 are all fed with gas from a similar distributing chamber 10 located at the other side of the block. Gas may be supplied to the distributing chamber 9 through a vertical passage 11 communicating with a gas supply pipe 12 and gas may be supplied to the distributing chamber 10 through a vertical passage 13 communicating with a gas supply pipe 14.

The torch is so designed and operated that the jets issuing from the passages 3 and their discharge orifices 3' are high velocity jets. Therefore the passages 3 are preferably of generally Venturi shape, and outwardly divergent adjacent the discharge orifices, as shown in Figs. 2 and 3. The passages 7 and 8 are designed to deliver jets of relatively low velocity.

Oxygen is supplied to the distributing chamber 4 through the pipe 6 and acetylene or other suitable fuel gas is supplied to the distributing chambers 9 and 10 through the pipes 12 and 14. This may be reversed if desired but the high velocity jets supplied by the tapering passages 3 are preferably oxygen jets.

The passages 7 and 8 are inclined toward the passages 3 as shown in Figs. 2 and 3 but they do not communicate with the passages 3 within the torch block. Therefore the fuel gas issues from the torch tip separately from the oxygen. The arrangement is such that the jets of fuel gas and oxygen come together at a point outside of the torch tip to produce the combustible mixture for the flames.

It will now be seen that one series of jets, preferably the oxygen jets, issue from the torch tip at high velocity to give the torch the advantage of high velocity jets when it is used for descaling or flame-cleaning. If all the gas issued from the torch in high velocity jets there would be danger of the flame being blown away from the face of the tip and blown out when the velocity of the gas feeding the jets exceeds the rate of flame propagation. By discharging the oxygen in high velocity jets and the fuel gas in relatively low velocity jets, or vice versa, and by discharging the gases into the recess 2, this action is prevented. Since the oxygen and fuel gas mix outside of the torch tip, the torch when used for descaling or flame-cleaning not only has the advantage of high velocity jets but also has the advantage of external-mixing, both of these being important advantages of a descaling or flame-cleaning torch as above stated. It is well understood in the art that higher flame temperatures are obtained by increasing the oxygen-acetylene ratio up to 2½ to 1 or even higher, and higher flame temperatures are an important advantage in descaling. However, gas mixtures having high oxygen-acetylene ratios are so explosive that they flash back readily in an ordinary torch tip if the tip becomes hot. With a torch tip of the kind herein described the ratio of oxygen to acetylene can be as high as desired.

Figs. 5 and 6 show another form of the invention in which the gas for the high velocity jets issues through two central rows of passages 15 and 16 inclined toward each other as shown in Fig. 5. The passages 15 and 16 terminate in adjacent parallel rows of discharge orifices 15' and 16' in the face of the recess 2. Gas is fed to all of the passages 15 from a distributing chamber 17 extending lengthwise of the block and gas is fed to all of the passages 16 from a similar distributing chamber 18 adjacent the distributing chamber 17. Gas is supplied to the distributing chambers 17 and 18 through vertical passages in the block communicating with separate gas pipes which do not appear in the drawing.

The gas for the relatively low velocity jets issues through two rows of outside passages 19 and 20 terminating in two rows of discharge orifices 19' and 20' in the face of recess 2 as shown in Fig. 6. As best shown in this figure the orifices 15' and 16' for the high velocity jets are preferably staggered with respect to the orifices 19' and 20' for the low velocity jets. Gas is fed to all of the passages 19 from a distributing chamber 21 at one side of the block and extending lengthwise thereof and communicating with a gas supply pipe 22. Gas is fed to all of the passages 20 from a similar distributing chamber 23 at the other side of the block and communicating with a gas supply pipe 24. As best shown in Fig. 5 the passages 19 and 20 are inclined toward each other and toward the passages 15 and 16 for the high velocity jets.

The torch shown in Figs. 5 and 6 operates in the same way as that shown in Figs. 1 to 4 except that two rows of high velocity jets issue between the two rows of low velocity jets instead of just a single row as in the case of the torch of Figs. 1 to 4. If desired, oxygen may be supplied to both of the distributing chambers 17 and 18 so that oxygen is fed to both rows of high velocity jets, and fuel gas may be delivered to both of the distributing chambers 21 and 23 so that fuel gas is fed to both rows of low velocity jets. Preferably, however, fuel gas is fed to one row of low pressure jets and to one row of high pressure jets and oxygen is fed to the other row of low pressure jets and the other row of high pressure jets. For instance, fuel gas may be delivered to the distributing chamber 21 to feed the low pressure jets issuing from low pressure passages 19, and oxygen may be fed to distributing chamber 23 to feed the other low pressure jets issuing from low pressure passages 20. Oxygen may be delivered to the distributing chamber 17 to feed the high pressure jets issuing from passages 15 and fuel gas may be delivered to the distributing chamber 18 to feed the other high pressure jets issuing from passages 16.

As in the case of the torch shown in Figs. 1-4 the gas passages do not communicate within the torch tip to produce internal-mixing but the passages of the respective rows converge and cause the oxygen and fuel gas to mix externally of the torch.

While the torch herein described was designed primarily for descaling and flame-cleaning metal surfaces it may be used for other purposes if desired, such as welding, flame hardening, etc.

I claim:

1. A descaling torch comprising an elongated block, two rows of gas passages in the block terminating in two rows of discharge orifices in a face of the block and extending lengthwise thereof, means for delivering oxygen to all of the passages of one row and fuel gas to all of the passages of the other row, the passages of the two rows having no communication within the block but being adapted to discharge the oxygen and fuel gas separately from the torch and to cause them to mix externally thereof, and each of the passages of one of the rows being of generally Venturi shape to increase the velocity of the gas passing through it.

2. A descaling torch comprising an elongated block having a recess in its lower face extending lengthwise of the block, two rows of gas passages in the block terminating in two parallel rows of discharge orifices in the face of said recess and extending lengthwise thereof, means for delivering oxygen to all of the passages of one row and fuel gas to all of the passages of the other row, the passages of the two rows having no communication within the block but being adapted to discharge the oxygen and fuel gas separately from the torch and to cause them to mix externally thereof, and each of the passages of one of the rows being divergent outwardly adjacent the discharge orifices thereof to increase the velocity of the gas passing through it.

3. A gas torch comprising an elongated block, two rows of gas passages in the block terminating in two parallel rows of discharge orifices in the face of said block and extending lengthwise thereof, the passages of one of said rows being inclined toward the passages of the other row, means for delivering gas to all of the passages of each row, at least one row of additional gas passages in the block located between the first-mentioned rows terminating in at least one row of discharge orifices located between the first-mentioned rows of discharge orifices, means for delivering gas to all of said additional passages, each of said additional passages being shaped so that they diverge outwardly adjacent the discharge orifices thereof to increase the velocity of the gas passing through it, and none of said passages being in communication within the block but being adapted to cause mixing of the gas delivered by them externally of the torch.

4. A gas torch comprising an elongated block having a recess in its lower face extending lengthwise of the block, two rows of gas passages terminating in two parallel rows of discharge orifices in the face of said recess and extending lengthwise thereof, the passages of one of said rows being inclined toward the passages of the other row, means for delivering gas to all of the passages of each row, at least one row of additional gas passages in the block located between the first-mentioned rows of passages and terminating in at least one row of discharge orifices located between the first-mentioned rows of orifices, means for delivering gas to all of said additional passages, each of said additional passages being of generally Venturi shape to increase the velocity of the gas passing through it, and none of said passages being in communication within the block but being adapted to cause mixing of the gas delivered by them externally of the torch.

5. A gas torch comprising an elongated block having a recess in its lower face extending lengthwise of the block, two rows of gas passages in the block terminating in two rows of discharge orifices in the face of said recess and extending lengthwise thereof, means for delivering gas to all of the passages of each row, two intermediate rows of additional gas passages located between the first-mentioned rows and terminating in two parallel rows of discharge orifices located between the first-mentioned rows of discharge orifices, means for delivering gas to all of said additional passages, each of said passages of said intermediate rows being of generally Venturi shape to increase the velocity of the gas passing through it, and none of said passages being in communication within the block but the passages in the respective rows being convergent to cause mixing of the gas discharged by them externally of the torch.

JOHN J. CROWE.